2,959,587

SENSITIVITY CONTROL DURING PURIFICATION OF CRUDE CYCLONITE

John R. Johnson, Alfred T. Blomquist, and Walter C. McCrone, Jr., Ithaca, N.Y., assignors to the United States of America as represented by the Secretary of War No Drawing. Filed July 16, 1943, Ser. No. 495,081

8 Claims. (Cl. 260—248)

The present invention relates to a high explosive known as cyclonite, and more particularly to a new and improved process of controlling the sensitivity thereof during purification.

Cyclonite is an explosive of great power and brisance obtainable by the direct nitrolysis of hexamethylenetetramine (hexamine), using very concentrated nitric acid. Although its constitution is not known with complete certainty at the present time, it appears to be cyclotrimethylenetrinitramine:

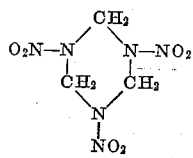

Within recent years, two improved methods have been devised for the manufacture of cyclonite, both of these new processes involving the use of acetic anhydride and which for convenience will hereinafter be referred to as the "anhydride" processes. The first of these is described in the copending application of Schiessler and Ross, Serial Number 444,254, filed May 23, 1942, now U.S. Patent 2,434,230. According to this method (which is known as the "McGill Process"), cyclonite may be obtained in good yields by the treatment of paraformaldehyde with ammonium nitrate in the presence of a dehydrating agent (acetic anhydride). More recently a so-called "Combination Process" has been described by W. E. Bachmann in application Serial No. 495,078, filed of even date herewith, now U.S. Patent 2,798,870. In the latter "anhydride" process, hexamine (or one of its salts) is treated with ammonium nitrate and concentrated nitric acid in the presence of a dehydrating agent (also acetic anhydride). As a matter of convenience, the cyclonite produced either by the "McGill" or by the "Combination Process" will be referred to hereinafter as "anhydride" cyclonite.

"Anhydride" cyclonite differs in certain important respects from that obtained by the direct nitrolysis of hexamine. Thus, the cyclonite produced by direct nitrolysis melts at about 205° C. and shows an impact sensitivity of about 50 cm., as measured by a standard type impact machine having a 5 kg. weight. "Anhydride" cyclonite, on the other hand, generally shows a lower melting point, and may exhibit a lower impact sensitivity rating (e.g., 35 to 45 cm.). Indeed, the impact sensitivity of "anhydride" cyclonite is subject to considerable variation, and dangerously sensitive batches (e.g., 4 to 10 cm.) are sometimes obtained.

It was of course recognized in the prior art that some method of avoiding the formation of highly sensitive batches of cyclonite was urgently needed, and many proposals were advanced with a view to solving this problem. Of the various forms of treatment which might solve this problem, the one which appeared to offer the greatest promise was a purification treatment originally devised for the purpose of de-acidifying the crude cyclonite and improving its vacuum stability. As described and broadly claimed in the copending application of W. E. Bachmann, Serial No. 495,080, filed of even date herewith, now U.S. Patent 2,656,355, this process involved the formation of a solution of the crude cyclonite in a volatile essentially non-acidic organic solvent (e.g. acetone) after which water (preferably in the form of steam) was introduced, and the solvent gradually replaced by water, thereby precipitating cyclonite substantially freed of occluded acid.

It was noted that the foregoing process as carried out with large batches generally improved the sensitivity of the crude cyclonite, and highly sensitive cyclonite was usually not obtained. Nevertheless, over a period of time (during which the reaction conditions for the preparation of cyclonite may have altered in some subtle manner) it was observed that highly sensitive batches (e.g., 4 to 10 cm.) of recrystallized cyclonite were occasionally obtained under recrystallization conditions which appeared to be substantially identical with those observed in previous runs wherein a material of satisfactory sensitivity had been obtained. It was therefore apparent that the fundamental sensitivity factors of the process, and the essential conditions necessary consistently and reliably to obtain normal sensitivity in the manufacture of "anhydride" cyclonite, were hidden in obscurity. Accordingly, what had originally been adopted and later relied upon at least partly as a safety precaution in the manufacture of a high explosive, in effect, created a false sense of security.

One of the principal objects of the present invention is to provide a simple and reliable method of working up "anhydride" cyclonite, which assures the production of a material of normal sensitivity.

Another object is the provision of a method of controlling the purification of "anhydride" cyclonite, which permits an overall speed-up in the recrystallization operation without bringing about conditions which tend to produce dangerously sensitive material.

Other objects and advantages of the present invention will be apparent as the description proceeds.

As previously indicated, the fundamental sensitivity factors of "anhydride" cyclonite have heretofore been surrounded with uncertainty, even though it was believed that they were in some manner related to an "impurity" known to be present in varying amounts in the cyclonite produced by the "anhydride" processes. As a rational step in the solution of the present problem, it was therefore first necessary to ferret out the latent causes of the high sensitivity occasionally observed, and after these basic factors became known, to provide a means of controlling the purification process in order to avoid those conditions which lead to the formation of a dangerously sensitive product. In view of the importance of the foregoing approach to the problem, it will be helpful initially to outline the fundamental factors found to be responsible for the observed variations in impact sensitivity of crude "anhydride" cyclonite, and thereafter to describe the improved purification process of the present invention by which the above mentioned objects may be attained. Although this discussion to some extent may involve certain theoretical considerations, it should be clearly understood that the process of the present invention while readily understandable in the light of such considerations, is in no way dependent upon the correctness of any theories which may herein be developed.

As previously intimated, the cyclonite produced by the "anhydride" processes is known to contain a by-product which is a high melting, explosive substance having the formula $C_4H_8O_8N_8$. This compound appears to possess an eight membered ring structure and on this assumption is a homologue of cyclonite (cyclotetramethylenetetranitramine), for which reason it may conveniently be referred to by the name "homocyclonite". Therefore by the term "homocyclonite" as used hereinafter in the description of the invention and in the claims is meant a homologue of cyclonite having a plurality of distinct polymorphic forms and found in "anhydride" cyclonite as a result of the method of producing the cyclonite. For reasons which will hereinafter appear, the observed variations in impact sensitivity of "anhydride" cyclonite are definitely related to the homocyclonite component thereof.

In the course of our investigations on the sensitivity of "anhydride" cyclonite, it has been established that pure cyclonite which is free of homocyclonite, crystallizes from a variety of solvents in a number of crystal habits having the same optical and physical properties. There is however, no evidence that pure cyclonite exhibits polymorphism, and the differences in crystal habits appear to have little effect on the impact sensitivity of cyclonite. We have found, however, that homocyclonite exhibits true polymorphism, and at least four, possibly more, distinct polymorphic forms (some of which have different crystal habits) may be isolated by procedures which will hereinafter be described.

Four of these polymorphic modifications of homocyclonite are characterized in Table I.

It will thus be seen that the beta homocyclonite polymorph does not differ widely in impact sensitivity from pure cyclonite, but that the alpha, gamma and delta modifications, at least in certain crystal habits, may be extremely sensitive.

Synthetic mixtures of cyclonite with varying amounts of the individual homocyclonite polymorphs have been prepared and the impact sensitivities thereof indicated clearly that small amounts of the alpha, gamma and delta modifications (particularly in the massive crystalline habits) may render the resulting mixture dangerously sensitive, where as the beta modification does not lower the sensitivity of the mixture below a safe minimum. The following sensitivity values for synthetic, co-precipitated cyclonite-homocyclonite mixtures obtained in one experiment, illustrate the danger which may arise when cyclonite contains the alpha and gamma forms of homocyclonite to the extent of about 8 to 10% (cyclonite= 51 cm.):

|  | Cm. |
| --- | --- |
| Cyclonite+beta homocyclonite | 47 |
| Cyclonite+alpha homocyclonite | 13 |
| Cyclonite+gamma homocyclonite | 9 |

From the foregoing considerations, it will be apparent that "anhydride" cyclonite of normal sensitivity can be obtained, provided the purification technique is so ad-

TABLE I

*Summary of crystal data for the polymorphs of homocyclonite*

|  | alpha monoclinic | beta monoclinic | gamma monoclinic | delta hexagonal |
| --- | --- | --- | --- | --- |
| System Habit Forms | rod, needle {010}, {100}, {001}, {111} | rod, massive {010}, {110}, {011}, {101} | plate, massive {110}, {001}, {100}, {101}, {011}, {010} | rod, massive {10$\bar{1}$1}, {0001}, {10$\bar{1}$0} |
| "a"∧"c" | 70° | 77° | 60° |  |
| Refractive indices: |  |  |  |  |
| alpha | 1.562–1.561 (red) / 1.561–1.563 (blue) | 1.589 | 1.537 | ε=1.566 |
| beta | 1.561–1.562 (red) / 1.563–1.561 (blue) | 1.594 | 1.585 | ω=1.607 |
| gamma | 1.72–1.75 | 1.73 | 1.666 |  |
| Optical orientation | α="b" (blue) / β="b" (red) | α="b" | γ="b" | ε="c" |
| Optic sign | (+) | (+) | (+) | (−) |
| acute bisectrix | α | α | α | α |
| Sign of elongation | (−) | (+) |  | (−) |
| Extinction Angle | 0°–15° | γ∧"c"=30° | γ∧"c"=42° |  |
| Optic axial angle | 0–10° (red) / 8–30° (blue) | 20° | 75° | Uniaxial. |
| Dispersion | inclined and crossed axial plane. | little or none | v>ρ |  |

Note on the identification of the various polymorphs of homocyclonite in mixtures: An especially convenient means of identifying a given polymorph is by its interference figure. This is especially true of the three modifications which are metastable at room temperature since they are generally ill-formed, rounded crystals that have partially transformed to the stable beta modification. The value of the interference figure lies in the fact that it permits one to determine the optical axial angle and the dispersion of the crystal. It can be seen from Table I that these properties are very different for each of the four polymorphs of homocyclonite.

Apparently because of differences in the arrangement of the molecules and the lattice energies of the polymorphs, the various polymorphic forms of homocyclonite exhibit different impact sensitivities. Thus in one experiment the following impact sensitivities for four homocyclonite modifications were observed on a testing machine which gave a sensitivity reading of 43 cm. for pure cyclonite:

|  | Cm. |
| --- | --- |
| Beta homocyclonite | 33 |
| Alpha homocyclonite | 12 |
| Gamma homocyclonite | 7 |
| Delta homocyclonite | 5 | justed that the ultimate composition contains cyclonite and beta homocyclonite, with only traces, if any, of the more sensitive polymorphic forms of homocyclonite. In short, one of the objects of a purification process, expressed in terms of the previously unknown factors, should be to rid the crude cyclonite of all homocyclonite polymorphs with the exception of the beta modification.

The manner in which the foregoing basic objective may be attained in accordance with the present invention can best be understood by a brief reference to solubility-temperature relations of the homocyclonite polymorphs, and their rates of transformation. Here again it is desirable to emphasize that, although these considerations greatly assist an understanding of the fundamental factors of the present invention, the process as hereinafter described is in no wise dependent upon the correctness of the explanations which are herein advanced.

As a result of investigations with pure homocyclonite it has been found that any of the polymorphic modifications thereof can be obtained by proper control of the conditions of crystallization. These critical conditions include, firstly, the rate of cooling of the solution, and secondly, the temperature at which crystallization takes place. Moreover, it has been found that the delta polymorph is apparently the stable form above a critical temperature of approximately 158° C.; the alpha is the stable form between about 150° C. and about 156° C.; and the relatively insensitive beta modification is the stable form at temperatures below about 150° C. Accordingly, if crystallization ensues below a temperature of about 150° C., the relatively insensitive beta polymorph will be obtained, unless the rate of cooling of the solution is such that a metastable form is precipitated.

Considering firstly a solution of pure homocyclonite which is undersaturated with respect to any polymorph at temperature above about 150° (i.e., one which becomes saturated below the lower critical temperature), if such a solution is slowly cooled, under conditions which avoid supersaturation (e.g., with agitation of the solution or with proper seeding), it has been found that the relatively insensitive beta modification is the only form which separates. If, however, the solution is supercooled below the equilibrium temperature for the separation of beta polymorph, it will reach a temperature at which alpha homocyclonite can separate. Further supercooling before crystals can separate will give the gamma modification, or higher, still more sensitive and more unstable modifications. Thus by controlling the rate of cooling, the various modifications may be obtained.

To illustrate the foregoing: If a solution of homocyclonite in 50% acetic acid is cooled slowly over a period of eight hours (spontaneous cooling), with the provision of suitable means for preventing supercooling (e.g., agitation), the solid crystallizing out will be the beta modification. If the same solution is cooled over a period of eight hours, without agitation or seeding with the beta modification, alpha homocyclonite will result. If the cooling period is two to three minutes, gamma homocyclonite is obtained. Instantaneous cooling obtained by dropping the solution drop-by-drop onto cracked ice gives a finely divided crystalline precipitate which may approach 80–90% delta homocyclonite.

As previously intimated, it has further been found that the stable form of homocyclonite at any temperature below about 150° is the beta modification, and therefore the higher polymorphs obtained on rapid cooling (if contacted for a sufficient time with the solvent medium at a temperature below the critical range indicated) will be transformed, principally through the solution phase, into the stable beta modification. The rates of transformation of the various metastable polymorphs into the beta form will be discussed hereinafter.

Considering now a solution of pure homocyclonite which becomes saturated with respect to any polymorph at a temperature above the previously mentioned upper critical temperature of about 158° C. (for example, a nitrobenzene solution which becomes saturated at 165° C.), if the temperature falls slowly to 165° C., it will become saturated, not with the beta form, but with delta homocyclonite. If no supersaturation occurs, the delta form will separate exclusively at temperatures above about 158° C. as the solution cools further. If, however, the solution temperature falls (without supersaturation) below the critical temperature for the delta form (about 158° C.), under equilibrium temperature conditions, the delta form will be converted through the solution phase into a more stable form. On further cooling of the solution to below about 150° C., under equilibirum conditions, the less stable, more sensitive forms are ultimately transformed into beta homocyclonite, either directly or through the alpha form. Thus, even though the conditions are such that the more highly sensitive forms of homocyclonite originally separate—either because of the rate of cooling or because of the temperature at which crystallization occurs—the beta polymorph will ultimately constitute the only modification present, provided the crystals are maintained under equilibrium conditions in contact with the mother liquor for a sufficient period of time, at a temperature below about 150° C.

The rate at which the foregoing transformations take place is, of course, an exceedingly important factor in a process wherein sensitivity control is to be effected. The rate-factors in the transformation of the sensitive polymorphs to the stable beta form include among other things:

(1) The nature of the modifications,
(2) The nature of the solvent medium,
(3) The temperature of the solvent in contact with the crystals,
(4) The relative proportions of the various polymorphs,
(5) The presence or absence of cyclonite, and
(6) The degree of agitation.

The effect of the first two factors (i.e., nature of modification and solvent effect) is indicated by the following data (Table II) from illustrative transformation experiments performed at a temperature of 25° C. From the data given in this table, it is evident that, generally speaking, the higher polymorphs (e.g., the gamma and delta forms) are converted to the stable, insensitive beta form much more rapidly than is the alpha form. This fact is of importance in the control of the prior art purification process, for reasons which will hereinafter be pointed out.

The effects of the second and third factors (i.e., solvent and temperature effect) are indicated by the data given in Tables III and IV. From the data given in Table III, it is apparent that the rate of transformation in any given solvent is markedly increased at elevated temperatures. Table IV illustrates the conditions obtaining during an acetone purification where the gamma and beta polymorphs are originally present in approximately equal proportions. In this case the effect of increased temperature as the boiling point of the solution progressively rises, is offset by the change in the nature of the solvent in contact with the crystals.

TABLE II

*Time required for complete transformation of various homocyclonite polymorphs at 25° C. in various solvents, without agitation* [1]

| Transformation | $H_2O$ | $CH_3NO_2$ | 100% Acetone | 50% Acetone | 50% $CH_3COOH$ |
|---|---|---|---|---|---|
| alpha into beta | No change, 100 hours. | 60 minutes | 3 hours | 8 hours | No change in 48 hours. |
| gamma into beta | No change, 100 hours. | 10 minutes | 3 minutes | 2 hours | No change in 56 hours. |
| delta into beta | No change, 2 hours. | ½ minute | 5 seconds | 4 minutes | No change in 1 hour. |

TABLE III

*Time required for transforming alpha into beta homocyclonite in nitromethane and acetone at various temperatures, without agitation [1]*

| Solvent | Time for Complete Transformation, Minutes | Temperature, °C. |
|---|---|---|
| $CH_3NO_2$ | 5–6 | 95 |
| $CH_3NO_2$ | 6 | 85 |
| $CH_3NO_2$ | 6–8 | 74 |
| $CH_3NO_2$ | 12–14 | 58 |
| $CH_3NO_2$ | 45 | 29 |
| Acetone | 30 | 45 |
| Acetone | 90–100 | 30 |

[1] The transformation times given in Tables II and III are for samples consisting entirely of the indicated modifications. The times given are approximate.

TABLE IV

*Time required for transforming gamma into beta homocyclonite at various temperatures [1]*

| Solvent | Time, minutes | Temperature of solvent, °C. |
|---|---|---|
| Water+5% Acetone | 30 | 78 |
| Water+2% Acetone | 30 | 93 |
| Water+1% Acetone | 45 | 98 |
| Pure Water | 60 | 100 |

[1] Agitated solvent maintained at reflux temperature in contact with an equal amount of beta and gamma homocyclonite at the start of the experiment. The times given are approximate.

The effects of the fourth and fifth factors mentioned above (i.e., the relative proportions of the various homocyclonite polymorphs present in the material, and the presence or absence of cyclonite in the composition) are illustrated by the data given in Table V.

TABLE V

*Effect of homocyclonite concentration and of the presence of cyclonite on rate of transformation of gamma into beta homocyclonite (agitated solvent maintained at reflux temperature)*

| Sample Solvent | Time for Complete Transformation, minutes | Temperature, °C. |
|---|---|---|
| A—pure water | 60 | 100 |
| A—1% acetone | 45 | 98 |
| B—pure water | 10 | 100 |
| B—1% acetone | 7 | 98 |
| C—pure water | 27 | 100 |
| C—1% acetone | 13 | 98 |

The times given are approximate.
A=50% beta homocyclonite+50% gamma homocyclonite at start of experiment (1 gr. sample in 30 gr. solvent).
B=90% beta homocyclonite+10% gamma homocyclonite at start o experiment (1 gr. sample in 30 gr. solvent).
C=90% cyclonite+9% beta homocyclonite+1% gamma homocyclonite at start of experiment (10 gr. sample in 30 gr. solvent).

In order to ascertain whether the foregoing data on pure homocyclonite were applicable to mixtures containing cyclonite as the major component and homocyclonite as the minor component, a number of experiments were carried out on acetone-purified batches of "anhydride" cyclonite containing a relatively high percentage of homocyclonite (about 10%). In the first experiment, a saturated solution of the cyclonite-homocyclonite composition in 50% acetic acid was cooled at various rates and the resulting crystals filtered, dried, examined microscopically and tested for sensitivity. The results were as follows:

TABLE VI

| Cooling Rate | Sensitivity of Cyclonite-Homocyclonite Mixture, cm. | Nature of Homocyclonite Present with the Cyclonite (Microscopic Examination) |
|---|---|---|
| 8 hours | 50 | beta. |
| 2 hours | 39 | beta+gamma.[1] |
| 1 hour | 20 | Do.[1] |
| 8 minutes | 25 | Do.[1] |

[1] The gamma modification was found to be present to the extent of 10% or less of the amount of beta homocyclonite in the sample.

These results indicated that the general principles established for isolated homocyclonite and for synthetic cyclonite-homocyclonite mixtures were applicable to "anhydried" cyclonite as directly obtained in the Bachmann "combination process."

A second series of experiments on the acetone purification of "anhydride" cyclonite containing about 10% homocyclonite was carried out. The "anhydride" cyclonite was dissolved in acetone and steam passed in very slowly. As the temperature of the solution rose, samples of crystals were removed at temperatures of 63.5°, 70°, 80°, 90°, 95° and the boiling point of water. The suspended crystals in each portion were filtered immediately before any appreciable cooling took place, then dried, examined microscopically and tested for impact sensitivity. The results were:

TABLE VII

| Sample | Temperature at which Sample was withdrawn, °C. | Sensitivity of Sample, cm. | Nature of Homocyclonite Present with Cyclonite in Sample (Microscopic Examination) |
|---|---|---|---|
| 1 | 63.5 | 46 | beta. |
| 2 | 70 | 34 | beta. |
| 3 | 80 | 37 | beta. |
| 4 | 90 | 39 | beta. |
| 5 | 95 | 37 | beta. |
| 6 | 98 | 28 | beta + gamma. |

1 to 6 represent decreasing concentrations of acetone from 100% to about 1–2% or less. 98° C. was approximately the boiling point of water under the conditions of the experiment. The gamma homocyclonite observed in sample No. 6 was present to the extent of 10% or less of the amount of beta homocyclonite in the sample.

These data indicate that any higher homocyclonite polymorph which might separate during the earlier stages of acetone removal would be converted quite rapidly to the beta form in all concentrations of acetone down to a few percent. However, during the last stages of acetone removal (when the acetone concentration is very low) the possibility exists that the higher polymorphs separating during this stage of the process may not be maintained in contact with the mother liquor for a sufficient period of time to insure their conversion to the beta form, if the steam injection is stopped shortly after the gradually rising boiling point of the solution substantially reaches the boiling point of water. Therefore, in order to eliminate this possibility, the injection of steam should continue until the acetone concentration of the mother liquor is reduced to such an extent that the solution has approximately the solvent action of pure water (i.e., when the boiling point of the mother liquor is substantially that of pure water), and thereafter the resulting mother liquor should be maintained in contact with the separated crystals for a sufficient period of time and at a sufficient temperature to insure the complete conversion, to beta homocyclonite, of all the high polymorphs which might have been thrown out of solution during the final stages of acetone distillation.

Now as previously indicated, the higher homocyclonite polymorphs (e.g., the gamma and delta forms) may be converted to the insensitive beta modification much more rapidly than the alpha form. It is therefore a desirable condition that the sensitive polymorphs separating during the final stages of acetone distillation are obtained in the more rapidly convertible gamma or delta forms, rather than in the slowly convertible alpha form.

From the data given in Table V on the time required to convert gamma to beta homocyclonite in a composition comprising a very large proportion of cyclonite, with the gamma form of homocyclonite present to the extent of 10% or less of the amount of beta homocyclonite in the mixture (see Sample C), it will be apparent that the mother liquor from which the acetone has been removed by steam injection to such an extent that it has a solvent action substantially that of pure water, need be maintained in contact with the separated crystals for only about one-half hour at about 98–100° C., in order to insure the complete absence of higher homocyclonite polymorphs in the final product. Thereafter, the mother liquor may be cooled with agitation, substantially as heretofore, without creating the danger of precipitating any further quantities of sensitive polymorphs.

With the foregoing considerations in mind, it will now be convenient to describe in detail the basic conditions which should be observed during purification of "anhydride" cyclonite, in order consistently and reliably to obtain normally sensitive material. These conditions are as follows:

(1) Forming a concentrated solution of "anhydride" cyclonite in the selected low-boiling organic solvent (preferably non-acidic);

(2) Displacing the solvent with water by adding water either in the form of liquid or in the form of vapor (i.e., steam);

(3) Heating the solution to distill the volatile solvent;

(4) Continuing the heating of the solution until the solvent concentration in the resulting mother liquor is reduced to a value so low that the mother liquor has a solvent action substantially that of pure water, this step being accomplished, for example, by maintaining the mother liquid at the boiling point until the temperature thereof substantially reaches the boiling point of water;

(5) Thereafter maintaining the mother liquor in contact with the crystals at approximately the boiling point of water for about one-half hour or longer;

(6) And then cooling the mother liquor and separating the crystals therefrom.

(7) With efficient agitation during all the foregoing operations.

If the foregoing conditions are maintained, the purified product will not only be freed of occluded acidity and improved in vacuum stability, but will be characterized by normal impact sensitivity. In short, the purification process as described above embodies the essential conditions which should be maintained in order consistently and reliably to avoid the formation of dangerously sensitive batches of "anhydride" cyclonite during solvent purification.

The process of the present invention is useful not only in purifying crude "anhydride" cyclonite, but also in desensitizing previously purified but abnormally sensitive batches thereof. In other words, the process may be used to effect purification of crude cyclonite under conditions which avoid sensitization, or it may be employed solely for desensitizing purified cyclonite; or it may be adopted both for purification and desensitization of crude cyclonite.

The particular cyclonite-solvent selected for use in the process of the present invention is largely a matter of choice. However, it is usually desirable to employ an essentially non-acidic medium, so that the final product will be freed of occluded acidity. It is also desirable for economic reasons to employ a readily recoverable (hence readily volatile) cyclonite solvent. Such considerations, however, are of secondary importance. Accordingly, the following cyclonite solvents may be cited merely for the purpose of illustrating the large number of media from which an appropriate solvent may be selected for effecting purification of "anhydride" cyclonite in accordance with the present invention:

*Ketones.*—Acetone, methyl ethyl ketone, and its higher homologues such as methyl hexyl ketone, cyclohexanone and the like.

*Esters.*—Ethyl acetate, and its homologues;

*Nitro compounds.*—Nitromethane, nitroethane, nitropropane, and their homologues and analogues; nitrobenzene.

*Nitrogen compounds.*—Acetonitrile and the like.

Of the foregoing solvents, acetone and nitromethane are the preferred media for carrying out the process of the present invention. It will be noted that one of these (acetone) is miscible in all proportions with water, whereas the other (nitromethane) is not. Both, however are essentially non-acidic and readily volatile (B.P. 56.1° and 101.9° C., respectively), which facilitates the distillation of the solvent during steam injection. In the case of nitromethane and similar water-immiscible media, the solvent is removed at least partly by steam-distillation.

In order still more clearly to disclose the nature of the present invention, a specific embodiment will now be described. It should be clearly understood, however, that this is done solely by way of example and is not to be construed as a limitation upon the spirit and scope of the appended claims.

EXAMPLE

Crude "anhydride" cyclonite was dissolved in 85% acetone (i.e., acetone containing 15% water) in the proportions of 5.8 parts of boiling acetone to one part of cyclonite on the dry basis. When the cyclonite was completely dissolved, the solution was agitated efficiently and wet steam was passed through the solution slowly (over a period of five to six hours) until the boiling point of the solution substantially attained the boiling point of water (98° C. under the prevailing atmospheric conditions where the process of this example was carried out). The injection of the steam into the agitated mother liquor was continued for one-half hour after the temperature of the solution first reached about 98° C. With continued agitation, the main body of mother liquor containing the suspended cyclonite was then cooled from 98° C. to about 30° C. in one to two and one-half hours, cooling being effected by means of cold water circulating through cooling coils immersed in the liquid. Thereafter the cyclonite was filtered from the mother liquor, a sample of the final product was withdrawn, dried, and tested for sensitivity and examined microscopically. The sample had an impact sensitivity value of 37 cm. and the homocyclonite present therein was entirely in the beta polymorphic modification.

In a control run the procedure was identical with that described above, except that the mother liquor was cooled immediately after the boiling point thereof substantially attained the boiling point of water. In this case, a sample of the crystals was withdrawn from the crystallizer after cooling and tested for sensitivity and examined microscopically. The sample had an impact sensitivity value of 32 cm. and contained gamma homocyclonite. It is therefore apparent that the process of the present invention insures the production of "anhydride" cyclonite of normal sensitivity and that the omission of the critical step of holding the solution at an elevated temperature for at least one-half hour after its boiling point attains that of water, creates a condition wherein abnormal sensitivity is apt to result.

One of the advantages of the process of the present invention arises from the fact that the final cooling step need not be carried out slowly (i.e., spontaneously, over a several-hour period) in order to obviate the separation of highly sensitive polymorphs during this final cooling operation. Thus the process permits an actual speed-up in the purification procedure, while at the same time insuring the complete absence of unstable polymorphs of homocyclonite in the purified product.

In the foregoing detailed description of the present invention it will be apparent that many variations may be made without departing from the spirit and scope thereof. We therefore intend to be limited only in accordance with the following patent claims.

We claim:

1. In the purification of cyclonite-homocyclonite mixtures by forming a solution thereof in a substantially inert volatile cyclonite-solvent and thereafter displacing said solvent by introducing water into said solution and distilling said solvent, the improvement which comprises continuing the distillation of said solvent after the temperature of the resulting mother liquor substantially attains the boiling point of water, for a period of time from a few minutes to at least about one-half hour sufficient to convert any sensitive homocyclonite crystals to an insensitive modification.

2. In the purification of cyclonite-homocyclonite mixtures by forming a concentrated solution thereof in a substantially inert volatile, cyclonite-solvent and thereafter distilling said solvent by injecting steam into said solution, the improvement which comprises continuing the injection of said steam after the boiling point of the resulting mother liquor substantially attains the boiling point of water, for a period of time from a few minutes to at least about one-half hour sufficient to insure the conversion of sensitive homocyclonite crystals to an insensitive modification, and then cooling the resulting mother liquor, with agitation, while still in contact with the separated solids.

3. The process of claim 2 wherein said solvent comprises a volatile ketone.

4. The process of claim 2 wherein said solvent comprises a volatile nitroparaffin.

5. In the purification of cyclonite-homocyclonite mixtures by forming of a hot concentrated solution thereof in acetone and injecting wet steam into said solution whereby acetone is progressively displaced by water and the cyclonite separates as a solid, the improvement which comprises continuing the injection of steam, after the temperature of said solution rises approximately to the boiling point of water, for a sufficient period of time from a few minutes to at least about one-half hour to insure the substantially complete conversion of any sensitive homocyclonite crystals to an insensitive modification, and then cooling said solution while still in contact with the separated cyclonite.

6. In the purification of crude cyclonite by forming a hot concentrated solution thereof in acetone and injecting wet steam into said solution to effect progressive displacement of said acetone with water and the concomitant separation of cyclonite as a solid, the improvement which comprises continuing the injection of steam into the resulting mother liquor for at least about one-half hour after the boiling point of the solution substantially attains the boiling point of water in order to insure the conversion of any highly sensitive solids into a stable, less sensitive modification; and then cooling the resulting mother liquor while still in contact with the separated solid cyclonite.

7. The purification of crude cyclonite which comprises dissolving said cyclonite in a substantially inert volatile solvent, agitating said solution, passing wet steam through said agitated solution until the boiling point of the solution attains the boiling point of water, continuing the introducting of the steam into said solution for a period of time from a few minutes to at least about one-half hour sufficient to convert any sensitive homocyclonite crystals in said solution to an insensitive modification, then rapidly cooling said solutoin and filtering off the separated cyclonite from the resulting mother liquor.

8. The purification of crude cyclonite which comprises dissolving said cyclonite in approximately an 85% volatile substantially inert organic solvent, heating the resulting solution for gradually distilling the volatile solvent, gradually displacing the organic solvent with water, maintaining the heating of the solution for about one-half hour after the mother liquor has attained a boiling point substantially that of pure water, cooling the mother liquor, separating the resulting crystals from the mother liquor and agitating the solution during all of the foregoing operations.

References Cited in the file of this patent

UNITED STATES PATENTS

| | | |
|---|---|---|
| 1,402,693 | Herz | Jan. 3, 1922 |
| 2,439,648 | Burtle | Apr. 13, 1948 |
| 2,525,252 | Wilson et al. | Oct. 10, 1950 |
| 2,678,927 | Wright et al. | May 18, 1954 |
| 2,900,381 | Thatcher | Aug. 18, 1959 |

FOREIGN PATENTS

| | | |
|---|---|---|
| 670,921 | Germany | 1937 |
| 681,848 | Germany | Sept. 15, 1939 |

OTHER REFERENCES

Poppenberg: Chem. Abstracts, vol. 35, page 7195.